(No Model.)

G. S. SHEFFIELD.
CAR WHEEL.

No. 263,732. Patented Sept. 5, 1882.

Attest.
John C. Perkins
A. V. Bright

Inventor:
Geo S. Sheffield
By ...........
Atty.

UNITED STATES PATENT OFFICE.

GEORGE S. SHEFFIELD, OF THREE RIVERS, MICHIGAN, ASSIGNOR TO THE SHEFFIELD VELOCIPEDE CAR COMPANY, OF SAME PLACE.

CAR-WHEEL.

SPECIFICATION forming part of Letters Patent No. 263,732, dated September 5, 1882.

Application filed June 15, 1882. (No model.)

*To all whom it may concern:*

Be it known that I, GEORGE SOLYMAN SHEFFIELD, of Three Rivers, in the county of St. Joseph and State of Michigan, have invented certain new and useful Improvements in Car-Wheels; and I do hereby declare the following to be a full, clear, and exact description of the invention, such as will enable others skilled in the art to which it pertains to make and use the same.

My invention relates to car-wheels adapted especially for use with railroad-velocipedes or hand-cars, the object being to provide a wheel which will combine lightness, strength, and cheapness of construction with durability in use. With this end in view the invention consists in the details of construction and combinations of parts hereinafter fully described, and pointed out in the claims.

Figure 1:
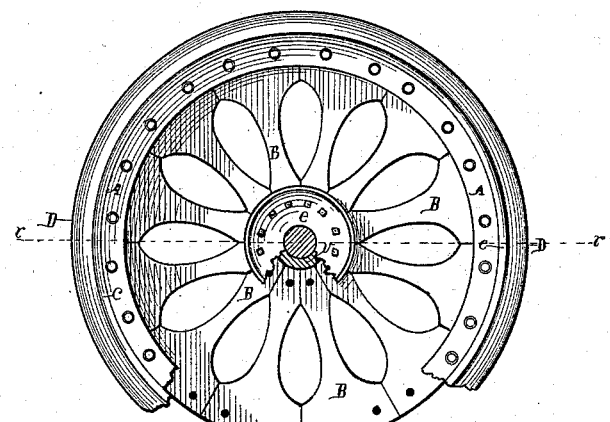
Figure 3:
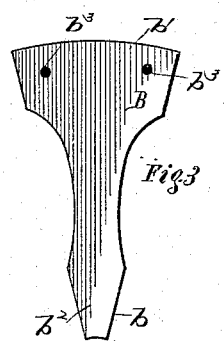
Figure 2:
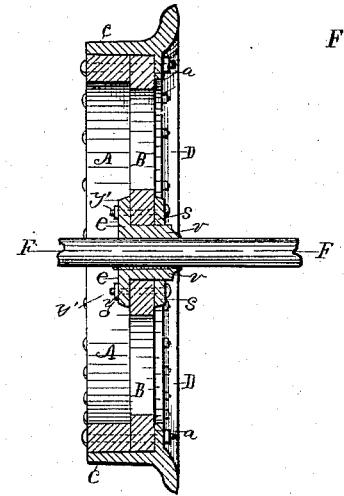
Figure 4:
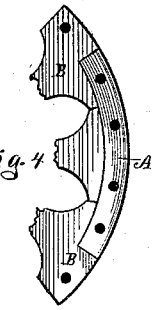

In the drawings, Figure 1 represents an elevation of a wheel constructed in accordance with my invention and partly broken away to show the joining of the spokes. Fig. 2 is a section on the line $r\ r$, Fig. 1. Fig. 3 is a view of one of the spokes detached; and Fig. 4 is a detached view, illustrating the outer retaining-band of the wheel.

C represents the tread of the wheel, made of metal, and provided with a guard-flange, D, and an inner annular flange, $a$, the latter being at a right angle to the inner side of the tread.

$v$ represents the hub of the wheel, made of metal, and having an annular flange, $e$, formed integral therewith and on the opposite side of the hub from the flange of the tread.

B represents the spokes of the wheel, preferably made of wood, and each formed at its inner end with a wedge-shaped tenon, $b$, and at its outer end with an enlarged wedge-shaped portion, $b'$, the sides of the spoke being curved or cut away, as shown, to leave an oval-shaped space between two adjacent spokes. The wedge-shaped form of the tenons and outer ends of the spokes admits of a close joint between the spokes and adapts the latter to snugly fit together to form a perfect circle at their periphery. The spokes thus formed are secured to the hub-flange $e$ at their inner ends by a collar, S, which fits upon the outer end, $v$, of the hub, and is perforated to receive headed bolts $y$, which pass through the collar and through a perforation, $b^2$, in the inner end of each spoke and through the flange $e$, and are secured by nuts $y'$.

A represents the retaining band or ring for the outer ends of the spokes, said ring being adapted to fit within the tread C, to firmly clamp the spokes between it and the flange $a$ of the tread. Said ring is perforated to correspond with perforations $b^3$ of the hub and with perforations of the flange $a$. Suitable bolts, $a'$, are passed through the perforations of the ring A and the corresponding holes of the spoke and flange $a$, and are secured by nuts $a^2$ on the outer side of said flange. Thus the spokes are firmly clamped and bolted to the hub and tread, and by their peculiar form are securely braced against strain, and the wheel will be strong and durable, as well as light in structure, and comparatively inexpensive in its manufacture.

Many slight alterations as to form and construction might be resorted to without departing from the spirit of my invention. Hence I would have it understood that I do not limit myself to the exact construction shown and described.

Having fully described my invention, what I claim as new, and desire to secure by Letters Patent, is—

1. In a car-wheel, the combination, with a metal hub and a metal tire having a depending flange formed integral therewith, of wooden spokes having their inner ends fitting against the hub and their outer ends fitting against the metal tire, a wooden felly fitting against the tire and against the outer ends of the spokes, and bolts for securing the felly and spokes to the depending flange, substantially as set forth.

2. In a car-wheel, the combination, with a metallic tread having a depending flange formed integral therewith on its inner side and a metallic hub having a flange formed integral therewith on its outer end, of wooden spokes, a felly fitting against the inner periphery of the tread, a ring fitting upon the hub, and bolts for securing the parts together, substantially as set forth.

3. In a car-wheel, the combination, with a metal hub provided with a flange and a metal tire provided with a depending flange formed integral therewith, of wooden spokes provided at their inner ends with wedge-shaped tenons and at their outer ends with enlarged wedge-shaped portions, a retaining-ring encircling the hub, a felly fitting against the inner periphery of the tread, and bolts for securing the parts together, substantially as set forth.

In testimony whereof I have signed this specification in the presence of two subscribing witnesses.

GEORGE SOLYMAN SHEFFIELD.

Witnesses:
 ALBERT C. TITUS,
 EDWARD B. LINSLEY.